United States Patent
Kuraki et al.

(10) Patent No.: US 8,639,039 B2
(45) Date of Patent: Jan. 28, 2014

(54) APPARATUS AND METHOD FOR ESTIMATING AMOUNT OF BLURRING

(75) Inventors: Kensuke Kuraki, Kawasaki (JP); Jun Takahashi, Kawasaki (JP); Shohei Nakagata, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 13/036,339

(22) Filed: Feb. 28, 2011

(65) Prior Publication Data

US 2011/0229043 A1  Sep. 22, 2011

(30) Foreign Application Priority Data

Mar. 18, 2010  (JP) ................ 2010-062694

(51) Int. Cl.
*G06K 9/62* (2006.01)
(52) U.S. Cl.
USPC ............ 382/209; 382/103; 382/132; 382/190
(58) Field of Classification Search
USPC .................. 382/254, 103, 132, 190; 380/243; 235/494
See application file for complete search history.

(56) References Cited

U.S. PATENT DOCUMENTS

| | | | |
|---|---|---|---|
| 5,644,656 A * | 7/1997 | Akra et al. ................ | 382/215 |
| 5,689,562 A * | 11/1997 | Hassan et al. ............. | 382/236 |
| 5,726,435 A | 3/1998 | Hara et al. | |
| 5,774,599 A * | 6/1998 | Muka et al. ............... | 382/254 |
| 6,332,044 B1 * | 12/2001 | Loce et al. ................ | 382/269 |
| 6,608,941 B1 * | 8/2003 | Suzuki et al. ............. | 382/272 |
| 7,257,245 B2 * | 8/2007 | Oosawa .................... | 382/132 |
| 7,551,791 B2 | 6/2009 | Poon et al. | |
| 2002/0174346 A1 * | 11/2002 | Ting ........................ | 713/186 |
| 2004/0128656 A1 * | 7/2004 | Yamagata ................. | 717/136 |
| 2005/0286769 A1 * | 12/2005 | Satoh ....................... | 382/190 |
| 2007/0098222 A1 * | 5/2007 | Porter et al. .............. | 382/103 |
| 2007/0286514 A1 | 12/2007 | Brown et al. | |

(Continued)

FOREIGN PATENT DOCUMENTS

| | | |
|---|---|---|
| CN | 101489035 | 7/2009 |
| JP | 7-254037 | 10/1995 |

(Continued)

OTHER PUBLICATIONS

Chinese Office Action issued Oct. 30, 2012 in corresponding Chinese Patent Application No. 201110065505.2.

(Continued)

*Primary Examiner* — Vu Le
*Assistant Examiner* — Aklilu Woldemariam
(74) *Attorney, Agent, or Firm* — Staas & Halsey LLP

(57) ABSTRACT

An image processing apparatus includes: an interface unit for acquiring a readout image produced by capturing an image formed on a medium; a storage unit for storing a plurality of templates generated by superimposing different amounts of blurring on a prescribed pattern contained in the image, and for storing the amounts of blurring superimposed on the respective templates; and a processing unit adapted to detect a pattern region where the prescribed pattern is located on the readout image, calculate the degree of matching between the pattern region and each of the plurality of templates and, based on the degree of matching, identify a template that most closely matches the prescribed pattern located on the readout image, and estimate that the amount of blurring corresponding to the most closely matching template represents the amount of blurring superimposed on the readout image.

8 Claims, 10 Drawing Sheets

(56) References Cited

U.S. PATENT DOCUMENTS

| | | | |
|---|---|---|---|
| 2008/0187174 A1* | 8/2008 | Metaxas et al. | 382/103 |
| 2008/0205769 A1* | 8/2008 | Taguchi et al. | 382/209 |
| 2009/0087099 A1* | 4/2009 | Nakamura | 382/190 |
| 2009/0110303 A1 | 4/2009 | Nishiyama et al. | |
| 2009/0179995 A1 | 7/2009 | Fukumoto et al. | |
| 2009/0323950 A1 | 12/2009 | Nakagata et al. | |
| 2010/0246939 A1 | 9/2010 | Aisaka et al. | |

FOREIGN PATENT DOCUMENTS

| | | |
|---|---|---|
| JP | 2000-18920 | 1/2000 |
| JP | 2006-172417 | 6/2006 |
| JP | 2007-304733 | 11/2007 |
| JP | 2008-301044 | 12/2008 |
| JP | 2009-110349 | 5/2009 |
| JP | 2010-55194 | 3/2010 |
| WO | 2009/113598 A1 | 9/2009 |

OTHER PUBLICATIONS

M. Brown et al., "Image Pre-Conditioning for Out-of-Focus Projector Blur", 2006 IEEE Computer Society Conference on Computer Vision and Pattern Recognition, Jun. 2006, pp. 1956-1963.

Dai Sengyang et al., "Tracking Motion-Blurred Targets in Video", 2006 IEEE International Conference on Image Processing, IEEE, PI, Oct. 2006, pp. 2389-2392.

European Search Report dated Sep. 1, 2011 in corresponding European Patent Application 11156155.1.

Office Action mailed Oct. 1, 2013 in corresponding Japanese Application No. 2010-062694.

* cited by examiner

FIG.2A
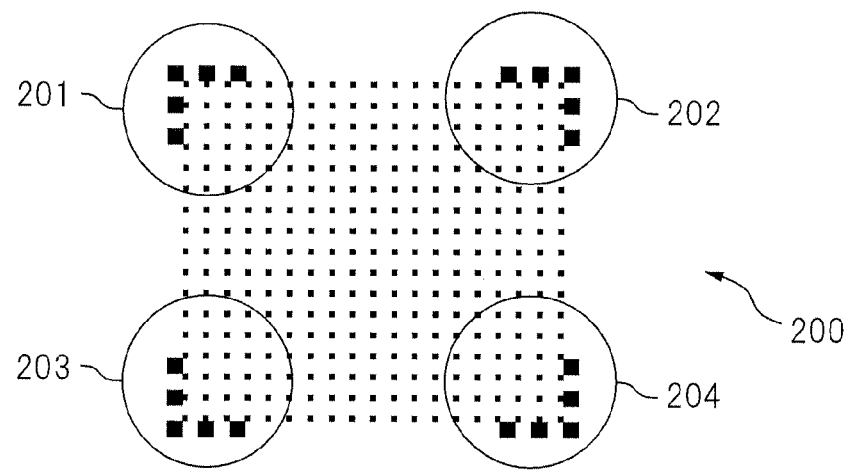
FIG.2B
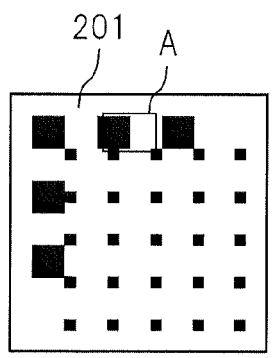
FIG.2C
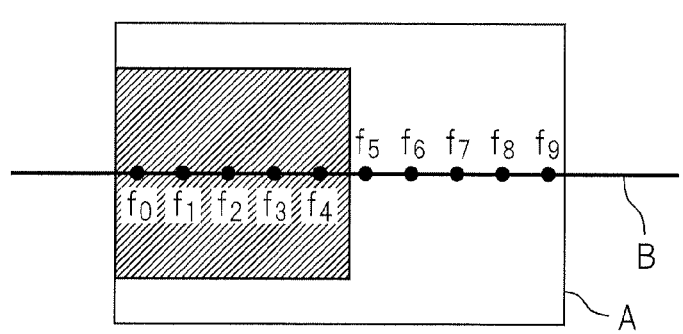
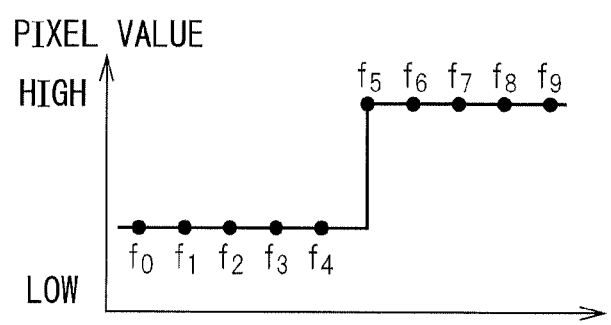

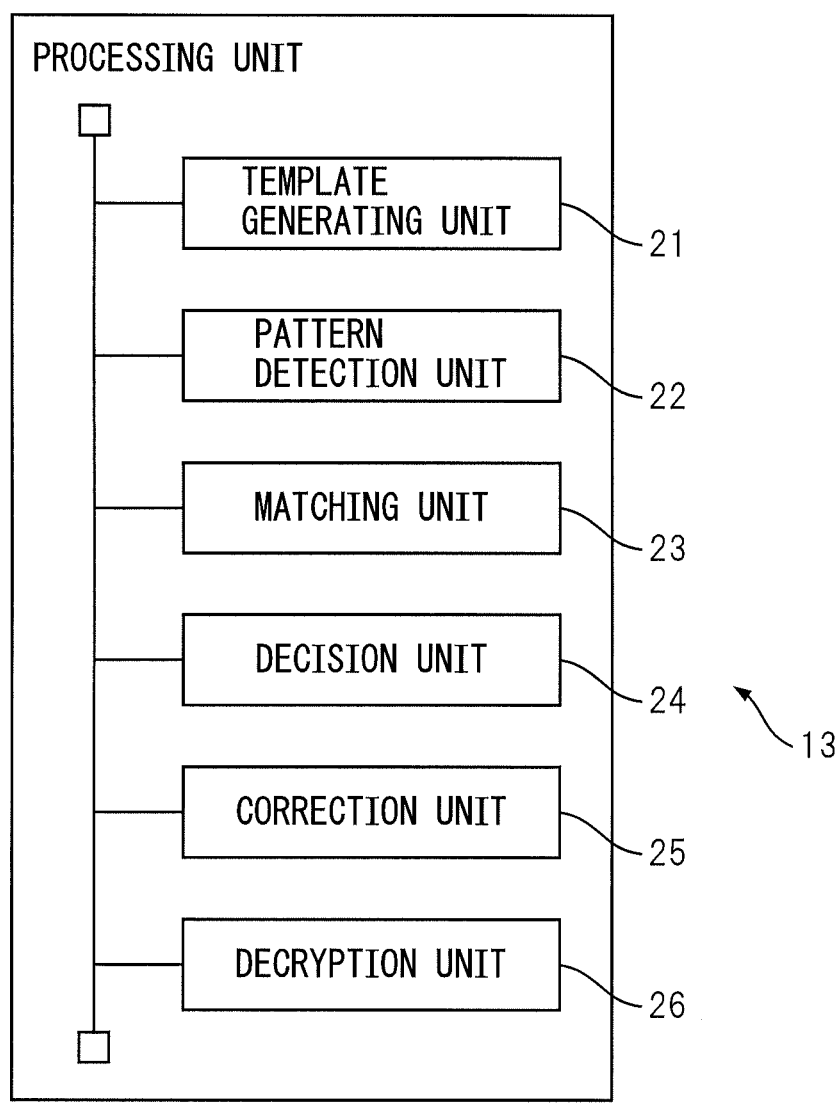

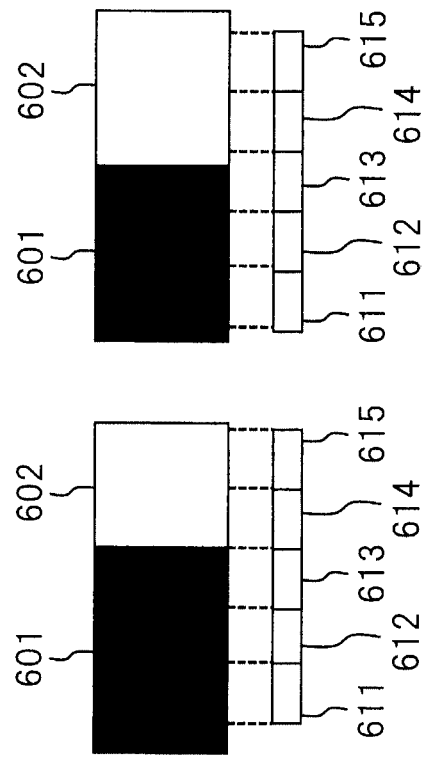

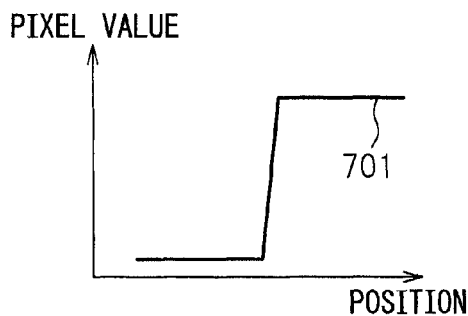
FIG.7A
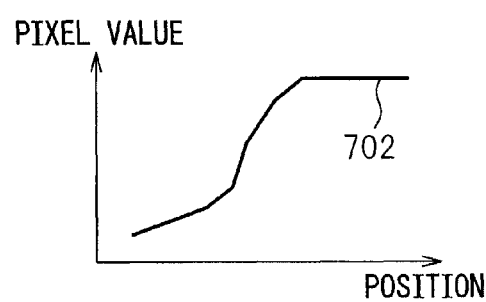
FIG.7B
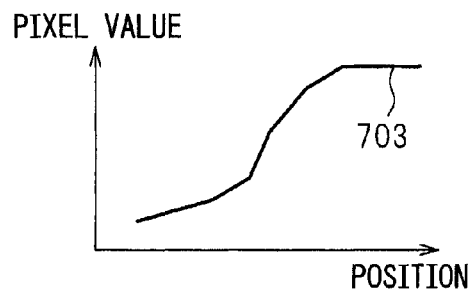
FIG.7C
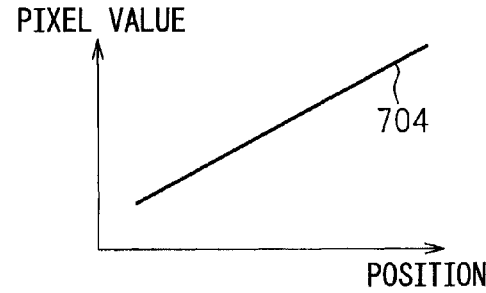
FIG.7D
FIG.8
| 1 | 2 | 3 | 4 |
|---|---|---|---|
| 5 | 6 | 7 | 8 |
| 9 | 10 | 11 | 12 |
801
| 7 | 1 | 8 | 2 |
|---|---|---|---|
| 9 | 3 | 10 | 4 |
| 11 | 5 | 12 | 6 |
802

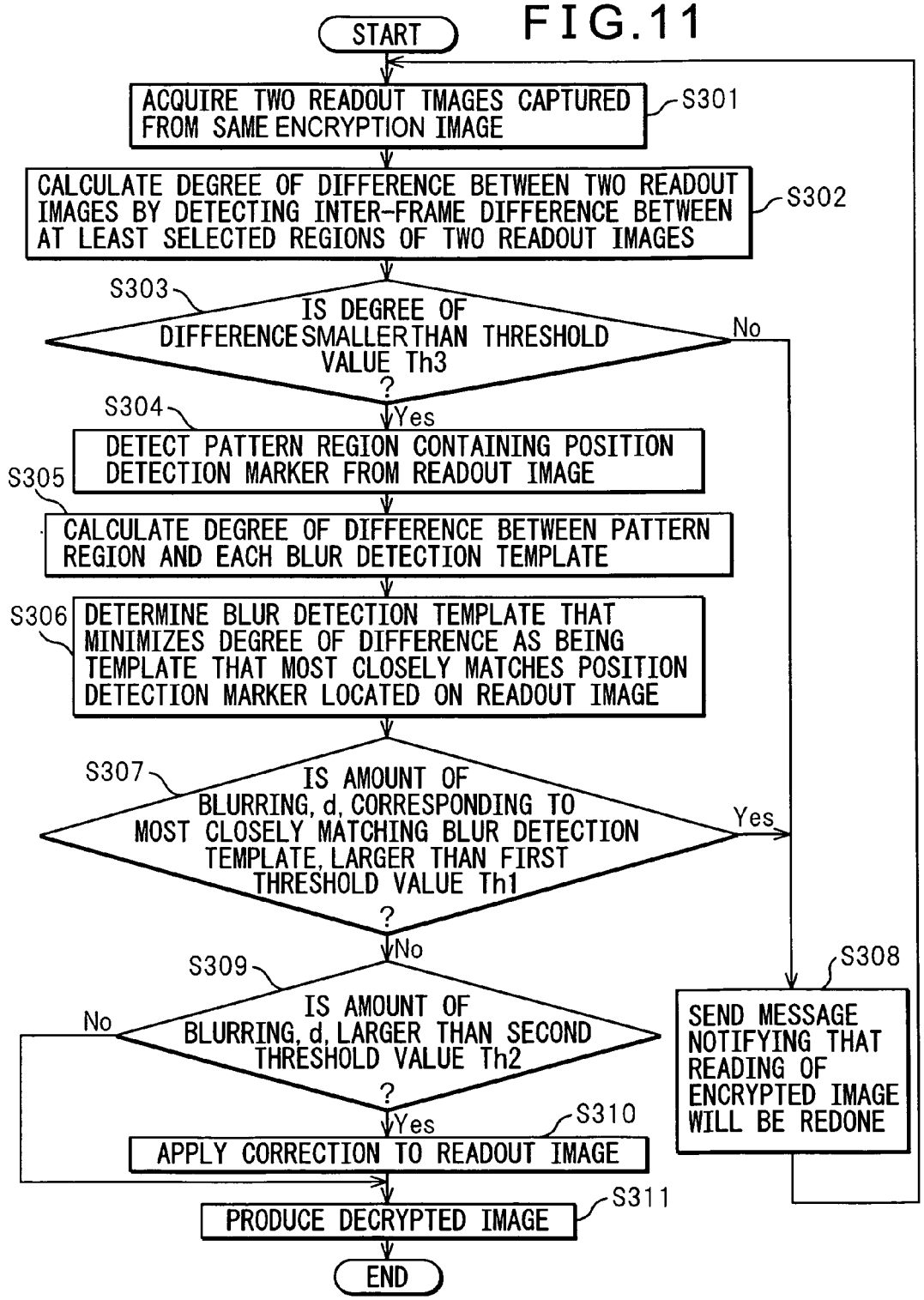

APPARATUS AND METHOD FOR ESTIMATING AMOUNT OF BLURRING

CROSS-REFERENCE TO RELATED APPLICATION

This application is based upon and claims the benefit of priority of the prior Japanese Patent Application No. 2010-62694, filed on Mar. 18, 2010, the entire contents of which are incorporated herein by reference.

FIELD

The embodiments discussed herein are related to an image processing apparatus for processing an image generated in the form of electronic data by converting an image printed on a medium, and an image processing method and an image processing computer program for implementing the same.

BACKGROUND

Two-dimensional codes which represent data in the form of patterns have been widely used in recent years. Such a two-dimensional code contains a location symbol having a prescribed pattern so that the position of the two-dimensional code can be determined from the image from which the two-dimensional code has been read (for example, refer to Japanese Laid-open Patent Publication No. H07-254037).

A technique has also been developed for preventing secret information printed on a print medium from being seen. For example, in one proposed technique, an image that needs to be prevented from being seen by a person other than an authorized person is encrypted in advance, and the thus encrypted image is printed on a medium such as paper (for example, refer to Japanese Laid-open Patent Publication No. 2008-301044). An encryption device using the above proposed technique encrypts a selected region of an input image by changing the ordering of pixels in that region on a block-by-block basis in accordance with a prescribed encryption key. Further, the encryption device attaches a location marker for locating the encrypted region to at least two of the four corners of the encrypted region. The encryption device further attaches a checking marker which is used to verify the validity of the decrypted image obtained by decrypting the encrypted region. On the other hand, a decryption device, using a reading device such as a scanner or a digital camera, reads a medium on which the image having the encrypted region is printed and converts the image into electronic data. Then, the decryption device recovers the original image by decrypting the encrypted region by referring to the location markers on the image converted into electronic data form.

However, when an image of a medium with a two-dimensional code or encrypted image printed thereon is captured by a digital camera or a camera-equipped mobile phone, the captured image may be blurred due to being out of focus, or a blurred image due to camera shake may be superimposed on the captured image. If such a blurred image is superimposed on the captured image, the data represented by the two-dimensional code shown in the image may not be recoverable. If the data can be recovered, the quality of the image obtained by decrypting the encrypted image will be far short of that of the original image.

On the other hand, there is proposed a technique for evaluating, based on the edge enhancement or auto-correlation value obtained from a captured image, the amount of blurring or camera shake superimposed on the captured image (for example, refer to Japanese Laid-open Patent Publication Nos. 2000-18920 and 2006-172417).

However, the edge enhancement or auto-correlation value detected from the captured image can vary depending on the image printed on the medium from which the image was captured. It is therefore desirable to develop a technique in which the amount of blurring superimposed on the captured image can be detected, independently of the image printed on the medium.

SUMMARY

According to one embodiment, there is provided an image processing apparatus. The image processing apparatus includes: an interface unit for acquiring a readout image produced by capturing an image formed on a medium; a storage unit for storing a plurality of templates generated by superimposing different amounts of blurring on a prescribed pattern contained in the image, and for storing the amounts of blurring superimposed on the plurality of templates, respectively; and a processing unit for detecting the amount of blurring superimposed on the readout image. The processing unit is adapted to detect a pattern region where the prescribed pattern is located on the readout image, to calculate the degree of matching between the pattern region and each of the plurality of templates and, based on the degree of matching, identify from among the plurality of templates a template that most closely matches the prescribed pattern located on the readout image, and to estimate that the amount of blurring corresponding to the most closely matching template represents the amount of blurring superimposed on the readout image.

According to another embodiment, there is provided a method for processing a readout image produced by capturing an image formed on a medium. The image processing method includes: acquiring the readout image produced by capturing the image formed on the medium; detecting a pattern region where a prescribed pattern contained in the image formed on the medium is located on the readout image; calculating the degree of matching between the pattern region and each of a plurality of templates generated by superimposing different amounts of blurring on the prescribed pattern and, based on the degree of matching, identifying from among the plurality of templates a template that most closely matches the prescribed pattern located on the readout image; and estimating that the amount of blurring corresponding to the most closely matching template represents the amount of blurring superimposed on the readout image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram depicting one example of an encrypted image.

FIG. 2B is an enlarged view of a position detection marker contained the encrypted image depicted in FIG. 2A.

FIG. 2C is a diagram illustrating a luminance distribution across a portion of the position detection marker depicted in FIG. 2B.

FIG. 4 is a block diagram illustrating the functional configuration of a processing unit according to the first embodiment.

FIG. 6A is diagrams depicting the relationship between the position of an edge of the position detection marker relative to light receiving elements and the pixel values in the vicinity of the edge of the position detection marker on the image.

FIG. 6B is diagrams depicting the relationship between the position of the edge of the position detection marker relative to the light receiving elements and the pixel values in the vicinity of the edge of the position detection marker on the image.

FIG. 6C is diagrams depicting the relationship between the position of the edge of the position detection marker relative to the light receiving elements and the pixel values in the vicinity of the edge of the position detection marker on the image.

FIG. 6D is diagrams depicting the relationship between the position of the edge of the position detection marker relative to the light receiving elements and the pixel values in the vicinity of the edge of the position detection marker on the image.

FIG. 7A is a graph depicting the pixel value distribution across a black/white block boundary in a horizontal blur detection template.

FIG. 7B is a graph depicting the pixel value distribution across a black/white block boundary in a horizontal blur detection template.

FIG. 7C is a graph depicting the pixel value distribution across a black/white block boundary in a horizontal blur detection template.

FIG. 7D is a graph depicting the pixel value distribution across a black/white block boundary in a horizontal blur detection template.

FIG. 8 is a diagram illustrating a mapping between the position of each block on an original image and the position of each block on an image after scrambling.

FIG. 11 is an operation flowchart illustrating image processing which is controlled by a computer program executed on the processing unit in the image processing apparatus according to the second embodiment.

DESCRIPTION OF EMBODIMENTS

An image processing apparatus according to a first embodiment will be described below with reference to the drawings. When an image of a medium such as paper on which an image is printed is captured in the form of electronic data by an image capturing apparatus such as a digital camera or a camera-equipped mobile phone, the image processing apparatus detects the amount of blurring superimposed on the captured image due to an out-of-focus condition or camera shake. For this purpose, the image processing apparatus calculates the degree of matching between a known pattern contained in the image printed on the medium and each of a plurality of templates having different amounts of blurring. Then, the image processing apparatus determines that the amount of blurring corresponding to the template that most closely matches the known pattern on the image is superimposed on the captured image.

For convenience, the image printed on the medium will hereinafter be referred to as the printed image. The printed image as the image containing the known pattern here includes, for example, either an encrypted image obtained by encrypting the original image or an image of a two-dimensional code. As an example, it is assumed here that the printed image is an encrypted image. Further, the image obtained by capturing the printed image will be referred to as the readout image.

Figure 1:
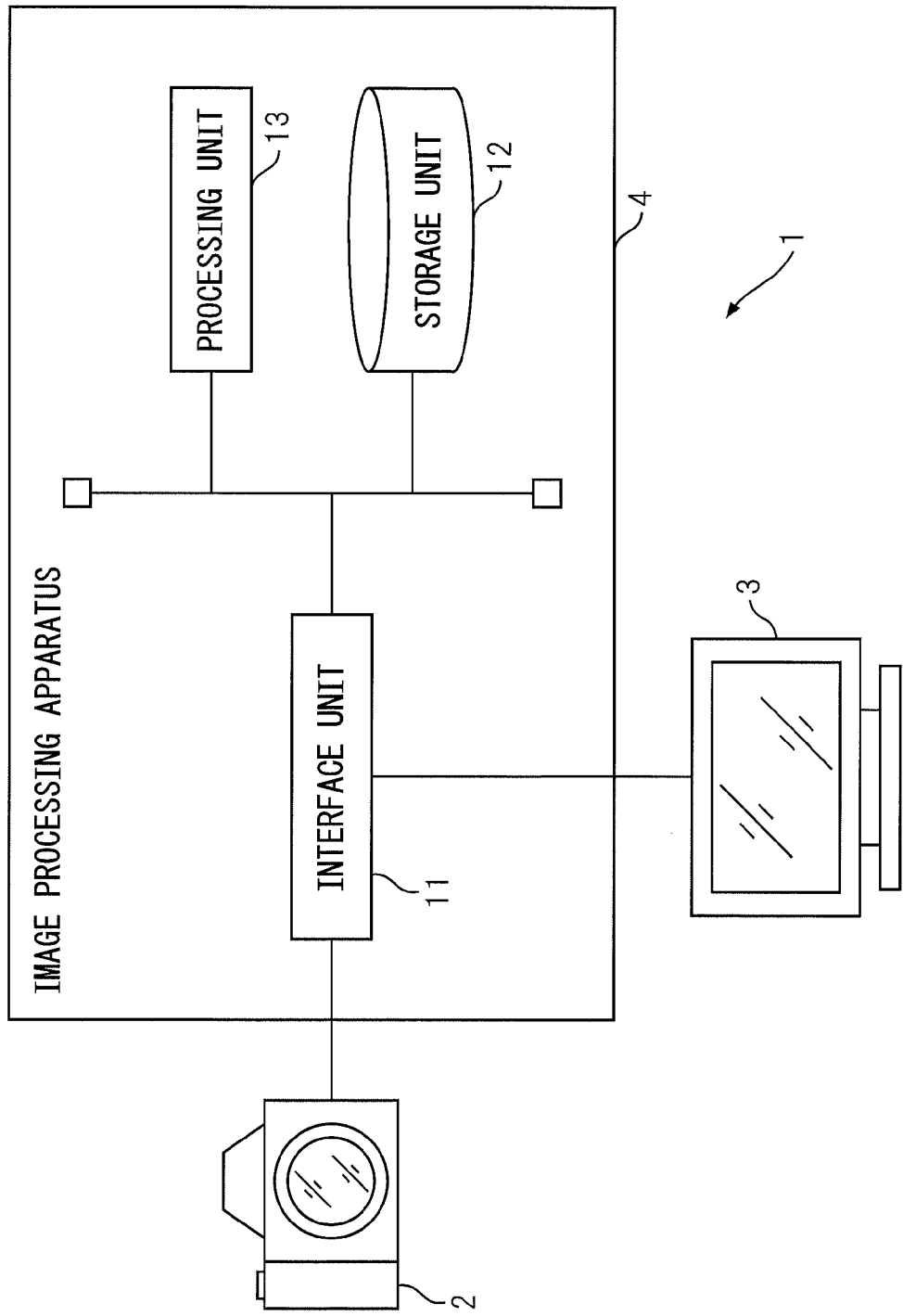
FIG. 1 is a diagram schematically illustrating the configuration of an image processing apparatus according to a first embodiment.

FIG. 1 is a diagram schematically illustrating the configuration of the image processing apparatus according to the first embodiment. The image processing apparatus 1 includes an interface unit 11, a storage unit 12, and a processing unit 13. The image processing apparatus 1 is connected to an image capturing apparatus 2 via the interface unit 11. The image processing apparatus 1 obtains a decrypted image by decrypting the readout image, i.e., the encrypted image converted into electronic data, acquired from the image capturing apparatus 2.

The image capturing apparatus 2 captures the encrypted image printed on a medium such as paper, and produces the readout image by converting the encrypted image into electronic data. For that purpose, the image capturing apparatus 2 includes a plurality of light receiving elements arranged in a two-dimensional array, and an optical system for focusing a captured image on the plurality of light receiving elements. The light receiving elements are, for example, solid-state imaging elements. The image capturing apparatus 2 may be combined with the image processing apparatus 1 in a single unit or may be provided as a separate unit independent of the image processing apparatus 1.

The interface unit 11 includes, for example, a communication interface for connecting the image processing apparatus 1 to the image capturing apparatus 2, and a control circuit for the interface. The communication interface may be an interface conforming, for example, to a communication standard such as a Universal Serial Bus (USB) or Small Computer System Interface (SCSI).

The interface unit 11 acquires the readout image from the image capturing apparatus 2 and passes the readout image to the processing unit 13. Further, the interface 11 receives the readout image or the decrypted image from the processing unit 13 and supplies the received image to an output apparatus 3 such as a display or a printer.

The interface unit 11 may further includes a communication interface for connecting the image processing apparatus 1 to a communication network conforming to a communication standard such as Ethernet (registered trademark) or to an integrated services digital network (ISDN), and an control circuit for the interface. Then, the image processing apparatus 1 may transmit the readout image or the decrypted image to some other apparatus via the interface unit 11. Alternatively, the image processing apparatus 1 may acquire the readout image from some other apparatus via the communication network.

The storage unit 12 includes at least one device selected, for example, from among a semiconductor memory, a magnetic disk device, and an optical disk device. The storage unit 12 stores a computer program to be executed within the image processing apparatus 1, parameters such as a decryption key to be used for decrypting the encrypted image, and the readout image acquired from the image capturing apparatus 2 or the decrypted image produced by the processing unit 13.

The storage unit 12 also stores pattern detection templates for identifying a region containing a known pattern on the encrypted image. The storage unit 12 further stores a plurality of blur detection templates, each generated by superimposing a prescribed amount of blurring on the known pattern on the encrypted image, and the amount of blurring and identification number corresponding to each blur detection template. The pattern detection templates and the blur detection templates will be described in detail later.

The processing unit 13 includes one or a plurality of processors and their peripheral circuitry. The processing unit 13 determines the amount of blurring superimposed on the readout image acquired from the image capturing apparatus 2. Further, the processing unit 13 produces the decrypted image by decrypting the readout image. Furthermore, the processing unit 13 controls the entire operation of the image processing apparatus 1.

FIG. 2A is a diagram depicting one example of the encrypted image. As depicted in FIG. 2A, position detection markers 201 to 204 for locating the encrypted image region are provided at the four corners of the encrypted image 200. The position detection markers 201 to 204 are patterns known in advance to the device that decrypts the encrypted image (in the present embodiment, the image processing apparatus 1). In the illustrated example, the position detection markers 201 to 204 each have a pattern in which low-luminance rectangular blocks and high-luminance rectangular blocks are arranged in alternating fashion along the horizontal and vertical directions. In FIG. 2A, the low-luminance blocks are indicated by black rectangles, while the high-luminance blocks are indicated by white rectangles. For convenience, the low-luminance blocks will hereinafter be referred to as the black blocks and the high-luminance blocks as the white blocks.

FIG. 2B is an enlarged view of the position detection marker 201 provided at the top left corner of the encrypted image 200. FIG. 2C is a diagram illustrating a distribution of pixel values in a portion of a pattern extending across a region A in FIG. 2B in the horizontal direction of the position detection marker 201. As illustrated in FIG. 2C, points $f_0$ to $f_9$ are set on a horizontal line B traversing the horizontal pattern of the position detection marker 201. Of the points $f_0$ to $f_9$, the pixel values at the points $f_0$ to $f_4$ located within the black block are lower than the pixel values at the points $f_5$ to $f_9$ located within the white block. The pixel value changes sharply at the block boundary between the points $f_4$ and $f_5$. Accordingly, in the case of an ideal readout image on which no camera shaking or blurring is superimposed, the luminance changes sharply at the boundary between the white block and the black block in the position detection marker.

Figure 3A:
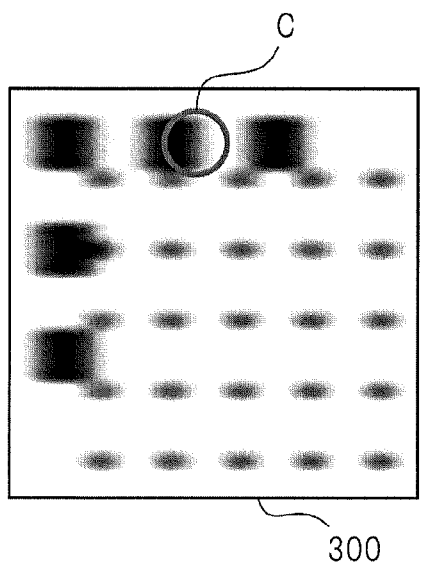
FIG. 3A is a diagram depicting an image of the position detection marker when the encrypted image depicted in FIG. 2A was captured as a blurred image because of camera shake in a horizontal direction.

FIG. 3A depicts one example of an image of the position detection marker 201 at the top left when the encrypted image depicted in FIG. 2A was captured as a blurred image because of camera shake in the horizontal direction.

When blur due to camera shake in the horizontal direction is superimposed on the readout image, as depicted in FIG. 3A, the boundary between the white block and the black block in the position detection marker 201 becomes indistinct in the image 300 of the position detection marker 201.

Figure 3B:
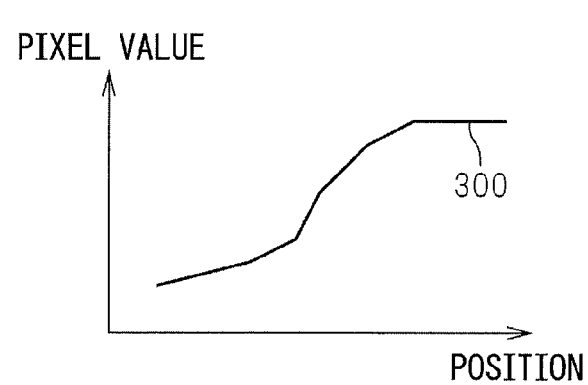
FIG. 3B is a graph depicting a luminance distribution in the horizontal direction across a region C in FIG. 3A.

FIG. 3B is a graph depicting a distribution of pixel values in the horizontal direction across a region C in FIG. 3A. In FIG. 3B, the abscissa represents the position taken along the horizontal direction of the readout image, and the ordinate represents the pixel value. As depicted by the graph 300, when blur due to camera shake in the horizontal direction is superimposed on the readout image, the pixel value gradually changes as the horizontal position changes, in contrast to the case of an image free from blurring. Then, as the amount of blurring superimposed on the readout image becomes larger, the boundary between the white block and the black block becomes more indistinct, and the pixel value changes more gradually across the boundary. In this way, the distribution of pixel values across the image of the position detection marker contained in the readout image varies depending on the amount of blurring superimposed on the readout image.

Accordingly, by examining the pixel value distribution across the known pattern contained in the position detection marker on the readout image, the processing unit 13 can determine the amount of blurring superimposed on the readout image.

FIG. 4 is a block diagram illustrating the functional configuration of the processing unit 13. The processing unit 13 includes a template generating unit 21, a pattern detection unit 22, a matching unit 23, a decision unit 24, a correction unit 25, and a decryption unit 26. These units constituting the processing unit 13 are functional modules implemented by executing a computer program on the processor contained in the processing unit 13.

The template generating unit 21 generates the blur detection templates, each by superimposing a prescribed amount of blurring on the position detection marker of the encrypted image.

The size of the position detection marker on the readout image changes according to the distance between the medium and the image capturing apparatus 2 used to capture the encrypted image. The value of the pixel at the white/black block boundary in the position detection marker also changes according to the relationship between the position of the boundary and the position of the light receiving elements contained in the image capturing apparatus 2. Further, the image of the position detection marker changes according to the amount of blurring caused by an out-of-focus condition or camera shake. In consideration of these facts, the template generating unit 21 generates the blur detection templates by simulating the images of the position detection marker that could occur on the readout image.

Figure 5:
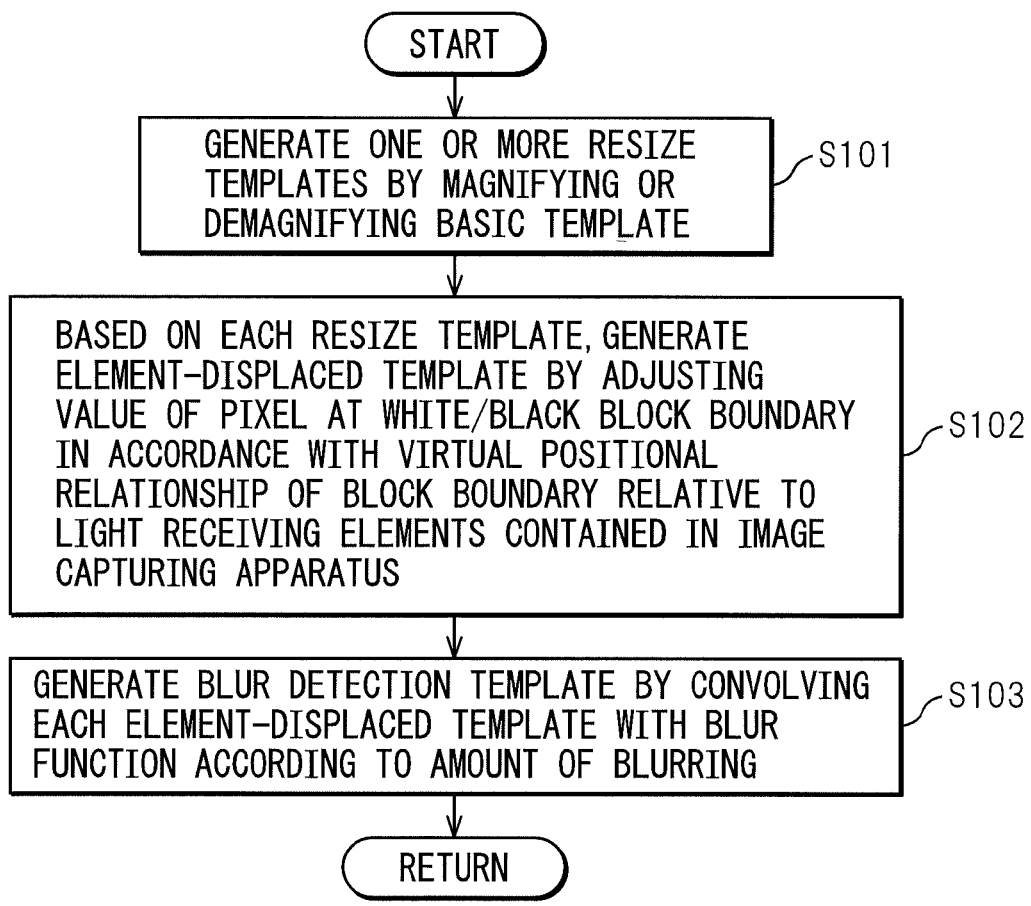
FIG. 5 is an operation flowchart illustrating the process for generating blur detection templates.

FIG. 5 is an operation flowchart illustrating the process for generating the blur detection templates. First, the template generating unit 21 generates one or more resize templates by magnifying or demagnifying a basic template having the same pattern as that of the entire or a selected portion of the position detection marker (step S101).

The basic template includes at least one white/black block boundary, and preferably two or more boundaries. For example, suppose that each pixel of the readout image is represented by a value in the range of 0 to 255 and that the luminance increases as the value increases; then, in the basic template, the pixel value corresponding to the white block is set to 255, and the pixel value corresponding to the black block is set to 0. The basic template may include a horizontal template containing horizontally arranged white and black blocks for detecting the amount of blurring in the horizontal direction, and a vertical template containing vertically arranged white and black blocks for detecting the amount of blurring in the vertical direction.

The template generating unit 21 generates one or more resize templates by magnifying or demagnifying the basic template by using the nearest neighbor method or linear interpolation method, for example, while changing the magnification/demagnification factor in increments of a predetermined value. The magnification factor is chosen to be, for example, within a range bounded by the largest demagnification factor corresponding to the lower limit at which each pixel of the encrypted image can be recognized on the readout image and the largest magnification factor corresponding to the upper limit at which the encrypted image can be captured in its entirety. The predetermined value is chosen to be, for example, within a range of 0.1 to 0.5.

Next, based on each resize template, the template generating unit 21 generates an element-displaced template by adjusting the value of the pixel at the white/black block boundary in accordance with the virtual positional relationship of the block boundary relative to the light receiving elements contained in the image capturing apparatus 2 (step S102).

FIGS. 6A to 6D are diagrams each depicting the relationship between the position of the white/black block boundary relative to the light receiving elements and the pixel values corresponding to the respective light receiving elements. In FIGS. 6A to 6D, the blocks 601 and 602 in the upper part correspond to the black block and white block contained in the position detection marker. On the other hand, five blocks 611 to 615 arranged in the horizontal direction indicate the respective light receiving elements. Graphs 621 to 624 located below the light receiving elements 611 to 615 are each a graph depicting the pixel values corresponding to the respective light receiving elements 611 to 615.

In FIG. 6A, the boundary between the black block 601 and the white block 602 coincides with the boundary between the light receiving elements 613 and 614. Accordingly, as depicted in graph 621, the pixel value corresponding to each of the receiving elements 611 to 613 is the same as the pixel value corresponding to the black block 601 (for example, 0), and the pixel value corresponding to each of the receiving elements 614 and 615 is the same as the pixel value corresponding to the white block 602 (for example, 255).

On the other hand, in FIG. 6B, the boundary between the black block 601 and the white block 602 is displaced to the left from the boundary between the light receiving elements 613 and 614 by one quarter of the width of the light receiving element 613. As a result, the black block 601 falls on three quarters of the light receiving element 613, and the white block 602 falls on the remaining one quarter. Therefore, as depicted in graph 622, the pixel value corresponding to the light receiving element 613 is somewhere between the pixel value corresponding to the black block and the pixel value corresponding to the white block. More specifically, the pixel value corresponding to the light receiving element 613 is equal to a value obtained by interpolating between the pixel value corresponding to the black block and the pixel value corresponding to the white block in accordance with the ratio of the area of the black block to the area of the white block falling on the light receiving element 613 (i.e., 0×¾+255×¼=63).

Similarly, in FIG. 6C, the boundary between the black block 601 and the white block 602 is displaced to the left from the boundary between the light receiving elements 613 and 614 by one half of the width of the light receiving element 613. As a result, the portion of the black block and the portion of the white block that fall on the light receiving element 613 are equal in area. Therefore, as depicted in graph 623, the pixel value corresponding to the light receiving element 613 is equal to the arithmetic mean taken between the pixel value corresponding to the black block and the pixel value corresponding to the white block (that is, 0×½+255×½=127).

Further, in FIG. 6D, the boundary between the black block 601 and the white block 602 is displaced to the left from the boundary between the light receiving elements 613 and 614 by three quarters of the width of the light receiving element 613. As a result, the black block 601 falls on one quarter of the light receiving element 613, and the white block 602 falls on the remaining three quarters. Therefore, as depicted in graph 624, the pixel value corresponding to the light receiving element 613 is equal to a value obtained by interpolating between the pixel value corresponding to the black block and the pixel value corresponding to the white block in accordance with the ratio of the area of the black block to the area of the white block falling on the light receiving element 613. That is, the pixel value corresponding to the light receiving element 613 is given as 191 (=0×¼+255×¾).

In view of the above, it is assumed that the template generating unit 21 can obtain images equivalent to various resize templates when the position marker on the medium is captured by the image capturing apparatus 2 by variously changing the distance between the medium and the image capturing apparatus 2. Then, the template generating unit 21 moves the position of the white and black blocks contained in each resize template by Δd in the horizontal or vertical direction, and calculates in accordance with the following equation the pixel value corresponding to the light receiving element on which the boundary between the white and black blocks falls.

$$e_i^{(M)} = \frac{100-M}{100} \times f_{s,i} + \frac{M}{100} \times f_{s,i+1} \quad (1)$$

$$(i = 0, 1, \ldots, n-1)$$

$$M = (\Delta d \times 100) \div d$$

where $e_i^{(M)}$ represents the pixel value corresponding to the light receiving element i located at the white/black block boundary. Further, d represents the horizontal length of the light receiving element when Δd is the amount of displacement in the horizontal direction, or the vertical length of the light receiving element when Δd is the amount of displacement in the vertical direction. On the other hand, $f_{s,i}$ and $f_{s,i+1}$ represent the pixel values of pixels i and (i+1) in the resize template fs. Here, when Δd is the amount of displacement in the horizontal direction, the pixels i and (i+1) are two horizontally adjacent pixels, and when Δd is the amount of displacement in the vertical direction, the pixels i and (i+1) are two vertically adjacent pixels. One of the pixels i and (i+1) is a pixel contained in the white block, and the other is a pixel contained in the black block.

For each resize template, the template generating unit 21 generates one or more element-displaced templates by changing Δd in increments of a predetermined value within a range of 0 to d and by obtaining the pixel value at the boundary by substituting each Δd into equation (1). The predetermined value here may be chosen to be, for example, within a range of d/10 to d/2.

In the present embodiment, the template generating unit 21 has been described as generating the element-displaced template by performing the calculation of equation (1) on the resize template. However, if the size of the position detection marker on the readout image is known and is substantially constant, the template generating unit 21 may generate the element-displaced template by performing the calculation of equation (1) on the basic template.

The template generating unit 21 generates each blur detection template by performing, in accordance with the following equation, a convolution computation between each element-displaced template and a blur function by variously changing the amount of blurring (step S103).

$$t_i^{(k)} = e_i^{(l)} * PSF(i, \sigma_N) \ (i=0, 1, \ldots, n-1) \quad (2)$$

where $e_j^{(k)}$ represents the pixel value of the pixel i in the k-th blur detection template. Further, $e_i^{(l)}$ represents the pixel value of the pixel i in the l-th element-displaced template. PSF(i, $\sigma_N$) represents the blur function having a parameter $\sigma_N$ corresponding to a prescribed amount of blurring. The operator "*" indicates the convolution computation.

The blur function here may be, for example, a point spread function. When superimposing camera shake-induced blur on the element-displaced template, the point spread function may be, for example, a one-dimensional Gaussian distribution function Gauss (i, $\sigma_N$) in a given direction, or a sinc function. When the point spread function is a one-dimensional Gaussian distribution function, the above equation (2) is expressed as $$t_i^{(k)} = \sum_{j=0}^{j=n-1} e_j^{(l)} \frac{1}{\sqrt{2\pi}\,\sigma_N} \exp\left\{-\frac{(j-i)^2}{2\sigma_N^2}\right\} \quad (3)$$

where $e_j^{(l)}$ represents the pixel value of the pixel j in the l-th element-displaced template. Further, n indicates the total number of pixels contained in the element-displaced template and located on a line extending along the given direction. $\sigma_N^2$ is the variance. The variance $\sigma_N^2$ corresponds to the amount of blurring, and the larger the variance $\sigma_N^2$, the larger the amount of blurring. The given direction may be, for example, a horizontal or vertical direction, or may be tilted at an angle θ (where 0<θ<180°) with respect to the horizontal direction.

When superimposing out-of-focus blur on the element-displaced template, the point spread function may be, for example, a two-dimensional Gaussian distribution function, or the square of the value obtained by dividing a Bessel function of the first kind, J1, by the distance x from the attention pixel, i.e., (J1/x)$^2$.

The template generating unit 21 may generate a blur detection template that contains both the camera shake-induced blur and the out-of-focus blur. In this case, the template generating unit 21 performs, for example, a convolution computation between the point spread function for the out-of-focus blur and the template obtained by performing a convolution computation between the element-displaced template and the point spread function for the camera shake-induced blur. Thereby, the template generating unit 21 can generate the blur detection template that contains both the camera shake-induced blur and the out-of-focus blur.

Alternatively, the template generating unit 21 may generate each blur detection template by performing a convolution computation between the resize template and the blur function. The blur detection template may contain the basic template, each resize template, and each element-displaced template.

Finally, the template generating unit 21 normalizes the generated blur detection template in accordance with the following equation.

$$ts_i^{(k)} = \frac{(t_i^{(k)} - AVG(T^{(k)}))}{STD(T^{(k)})} \quad (4)$$

$(i = 0, 1, \ldots n-1)$ where $t_i^{(k)}$ represents the value of the pixel i contained in the blur detection template $T^{(k)}$, AVG($T^{(k)}$) represents the average pixel value of the pixels contained in the blur detection template $T^{(k)}$, and STD($T^{(k)}$) represents the standard deviation of the values of the pixels contained in the blur detection template $T^{(k)}$. Further, n indicates the total number of pixels contained in the blur detection template $T^{(k)}$. On the other hand, $ts_i^{(k)}$ represents the value of the pixel i contained in the normalized blur detection template.

FIGS. 7A to 7D are graphs respectively depicting the pixel value distributions across the black/white block boundaries in the horizontal blur detection templates having different amounts of blurring. In FIGS. 7A to 7D, the abscissa represents the position along the horizontal direction, and the ordinate represents the pixel value. The graphs 701 to 704 depict the values of the pixels located in the vicinity of the black/white block boundaries in the respective blur detection templates.

The graph 701 of FIG. 7A corresponds to the blur detection template where no blur is superimposed. In this blur detection template, only the pixel located at the black/white block boundary has a value intermediate between the pixel value of the white block and the pixel value of the black block.

The graphs 702 to 704 each correspond to the blur detection template where blur is superimposed. The amount of blurring superimposed on the blur detection template corresponding to the graph 702 is the smallest, and the amount of blurring superimposed on the blur detection template corresponding to the graph 704 is the largest. As can be seen from FIGS. 7A to 7D, the larger the amount of blurring superimposed, the more gradual the pixel value changes across the black/white block boundary.

The template generating unit 21 stores each generated blur detection template in the storage unit 12 together with the identification number of the blur detection template and the amount of blurring corresponding to the blur function used for the generation of that template.

The pattern detection unit 22 detects the region where the position detection marker is located on the readout image. For example, the pattern detection unit 22 performs pattern matching between the readout image and a pattern detection template having a pattern similar to that of the position detection marker, and finds the position where the readout image most closely matches the pattern detection template. More specifically, the pattern detection unit 22 compares the corresponding pixels between the readout image and the pattern detection template while changing the position of the pattern detection template relative to the readout image, calculates the absolute pixel value difference for each pair of corresponding pixels, and takes the sum of the absolute differences as representing the degree of difference. In this process, the pattern detection unit 22 detects the position of the pattern detection template at which the degree of difference becomes minimum, and determines the thus detected position as being the pattern position at which the two patterns most closely match. Then, by reference to the pattern position, the pattern detection unit 22 defines a region whose size is equal to that of the position detection marker or a region whose size is equal to that of the position detection marker plus a prescribed margin, and sets the thus defined region as the pattern region.

For example, the position on the readout image that corresponds to the top left pixel of the pattern detection template when the readout image most closely matches the pattern detection template is set as the pattern position. In this case, the pattern detection unit 22 defines a region having that pattern position at its top left corner, having a width equal to the horizontal size of the position detection marker multiplied by 1.0 to 1.2, and having a height equal to the vertical size of the position detection marker multiplied by 1.0 to 1.2, and sets the thus defined region as the pattern region.

The size of the position detection marker in the readout image varies with the distance between the image capturing apparatus 2 and the encrypted image printed on the medium. Therefore, the plurality of resize templates earlier described may be used as the pattern detection templates. In this case, the pattern detection unit 22 performs pattern matching between the readout image and each of the plurality of resize templates. Then, the pattern detection unit 22 determines the pattern position by reference to the resize template that minimizes the degree of difference. Further, in this case, the pattern detection unit 22 may set the size of the pattern region larger as the magnification factor corresponding to the resize template that minimizes the degree of difference becomes larger. For example, when the magnification factor corresponding to the resize template that minimizes the degree of difference is unity, the pattern detection unit 22 sets the pattern region so as to have a predetermined standard width and height. On the other hand, when the magnification factor is other than unity, the pattern detection unit 22 sets the width and height of the pattern region by multiplying the standard width and height by that magnification factor.

Further, to determine the pattern position, the pattern detection unit 22 may detect on the readout image the boundary between each pair of white and black blocks contained in the position detection marker. The absolute difference between two adjacent pixels becomes maximum when one of the two pixels is contained in the white block and the other in the black block. Since the position detection marker has a plurality of white and black blocks arranged in alternating fashion, such a maximum absolute difference is detected at the boundary between each pair of white and black blocks. Further, the distance between adjacent maxima is equal to the length of the white or black block multiplied by the magnification factor of the encrypted image on the readout image. Therefore, the pattern detection unit 22 calculates the difference between each pair of horizontally or vertically neighboring pixels on the readout image and thus determines the absolute difference between them. Then, the pattern detection unit 22 obtains the position of each edge pixel at which the absolute difference becomes maximum. The pattern detection unit 22 detects, among a plurality of such edge pixels, a pair of edge pixels where the horizontal or vertical distance between the pixels is equal to the length of the white or black block in the position detection marker multiplied by a predetermined magnification factor. Then, the pattern detection unit 22 defines a region containing the detected pair of edge pixels and sets the thus defined region as the pattern region.

The pattern detection unit 22 may perform the detection of the edge pixels and the calculation of the distance between the edge pixels within the pattern region obtained by the pattern matching between the readout image and the pattern detection template. In this case, since the pattern region can be detected more accurately, the pattern detection unit 22 can set a smaller pattern region within the pattern region obtained by the pattern matching. This serves to reduce the amount of computation when the matching unit 23 performs pattern matching between the pattern region and the blur detection template. The processing to be performed by the matching unit 23 will be described in detail later.

Further, the pattern detection unit 22 may set a predetermined region on the readout image as the pattern region. For example, when it is expected that the encrypted image will be captured so as to occupy an area larger than one half of the readout image, the pattern detection unit 22 may divide the readout image into two blocks in the horizontal direction and as many blocks in the vertical direction, and may set the top left block as the pattern region.

The pattern detection unit 22 passes information indicating the position and size of the pattern region to the matching unit 23.

The matching unit 23 performs pattern matching between the pattern region containing the position detection marker detected on the readout image by the pattern detection unit 22 and each of the blur detection templates stored in the storage unit 12. Then, the matching unit 23 determines the blur detection template that most closely matches the position detection marker detected on the readout image.

More specifically, the matching unit 23 variously changes the position of the blur detection template relative to the pattern region, and calculates the degree of difference between the pattern region and the blur detection template at each position. The degree of difference indicates the difference between the matching of the pattern region and the blur detection template.

When the matching unit 23 calculates the degree of difference, it is preferable to make provisions in to prevent the degree of difference from varying depending on the brightness of the shooting environment at the time of the acquisition of the readout image. For that purpose, the matching unit 23 normalizes, in accordance with the following equation, the values of the pixels contained in a test region that is defined within the pattern region and that is identical in position and size to the bur detection template.

$$gs_i = \frac{(g_i - AVG(G))}{STD(G)} \quad (5)$$

$$(i = 0, 1, \ldots n-1)$$

where $g_i$ represents the value of the pixel i contained in the test region G, AVG(G) represents the average pixel value of the pixels contained in the test region G, and STD(G) represents the standard deviation of the values of the pixels contained in the test region G. Further, n indicates the total number of pixels contained in the test region G. Finally, $gs_i$ represents the value of the pixel i contained in the normalized test region G.

The matching unit 23 calculates, in accordance with the following equation, the degree of difference between the normalized test region G, defined at various positions within the pattern region, and the blur detection template.

$$M(k) = \frac{\left(\sum_{i=0}^{n-1} (gs_i - ts_i^{(k)})^2\right)}{n} \quad (6)$$

where M(k) represents the degree of difference between the k-th blur detection template and the normalized test region G. On the other hand, $gs_i$ represents the value of the i-th pixel contained in the normalized test region G, and $ts_i^{(k)}$ represents the value of the i-th pixel in the k-th blur detection template. Further, n indicates the total number of pixels contained in the test region G.

The matching unit 23 variously changes the position of the k-th blur detection template relative to the pattern region, and calculates the degree of difference M(k) at each position. Then, the matching unit 23 takes the minimum value Mmin (k) of the degree of difference M(k) as representing the degree of difference from the k-th blur detection template. In like manner, the matching unit 23 calculates the degree of difference between the pattern region and each of the blur detection templates stored in the storage unit 12.

The matching unit 23 obtains the minimum value Mmin among the degrees of difference Mmin(k) calculated for the respective blur detection templates. Then, the matching unit 23 determines that the blur detection template corresponding to the minimum value Mmin is the template that most closely matches the position detection marker contained in the readout image.

Alternatively, the matching unit 23 may obtain the degree of similarity, which is the reciprocal of the degree of difference, as the metric that indicates the degree of matching between the pattern region and the blur detection template. In this case, the matching unit 23 determines that the blur detection template providing the largest degree of similarity is the template that most closely matches the position detection marker contained in the readout image.

The matching unit 23 notifies the decision unit 24 of the identification number of the blur detection template that most closely matches the position detection marker contained in the readout image.

The decision unit 24 estimates that the amount of blurring, d, corresponding to the blur detection template determined by the matching unit 23 as being the template that most closely matches the position detection marker contained in the readout image, represents the amount of blurring superimposed on the readout image. Then, based on the amount of blurring, d, superimposed on the readout image, the decision unit 24 makes a decision as to whether the readout image is to be corrected or not or whether the readout image is to be reacquired or not.

For example, the decision unit 24 reads the storage unit 12 to retrieve the amount of blurring, d, corresponding to the identification number of the blur detection template that most closely matches the readout image. Then, the decision unit 24 compares the amount of blurring, d, with a first threshold value Th1. If the amount of blurring, d, is larger than the first threshold value Th1, the decision unit 24 discards the readout image. The decision unit 24 then notifies the processing unit 13 that the readout image is blurred. In this case, the processing unit 13 sends a message, via a user interface not depicted, urging the user to recapture the readout image. If a plurality of readout images captured from the same encrypted image are prestored in the storage unit 12, the processing unit 13 reads the storage unit 12 to retrieve a readout image other than the discarded one. Then, the processing unit 13 performs processing to detect the amount of blurring once again by using the reacquired readout image.

The first threshold value Th1 here is set, for example, to a value corresponding to the upper limit of the amount of blurring at which the encrypted image can be decrypted. Alternatively, the first threshold value Th1 may be set equal to the upper limit of the amount of blurring at which the user can read out the information contained in the decrypted image obtained by decrypting the encrypted image.

If the amount of blurring, d, is not larger than the first threshold value Th1, the decision unit 24 compares the amount of blurring, d, with a second threshold value Th2 which is smaller than the first threshold value Th1. If the amount of blurring, d, is larger than the second threshold value Th2, the decision unit 24 notifies the processing unit 13 that the readout image needs to be corrected. In response, the processing unit 13 passes to the correction unit 25 the readout image and the amount of blurring, d, corresponding to the blur detection template identification number received from the matching unit 23.

On the other hand, if the amount of blurring, d, is not larger than the second threshold value Th2, the decision unit 24 decides that the quality of the readout image is good. The decision unit 24 then passes the result of the decision to the processing unit 13.

The second threshold value Th2 here is set, for example, equal to the lower limit of the amount of blurring above which the quality of the decrypted image obtained by decrypting the encrypted image is judged to be not good.

The larger the area of the encrypted image captured in the readout image, the relatively smaller the magnitude of the blurring of the encrypted image becomes; therefore, if the same amount of blurring is superimposed, the quality of the image decrypted from the encrypted image becomes better as the area of the encrypted image becomes larger. In view of this, the first threshold value Th1 and the second threshold value Th2 may be set to larger values as the area of the encrypted image captured in the readout image becomes larger.

In this case, the storage unit 12 stores, in addition to the identification number of the blur detection template, the magnification factor corresponding to the resize template used to generate the blur detection template. The decision unit 24 retrieves from the storage unit 12 the magnification factor corresponding to the identification number of the blur detection template that most closely matches the readout image. Then, the decision unit 24 sets the first and second threshold values Th1 and Th2 by multiplying the standard values of the first and second threshold values Th1 and Th2 by the magnification factor.

The correction unit 25 applies edge enhancement to the readout image according to the amount of blurring reported from the processing unit 13. For example, the correction unit 25 generates a frequency image by Fourier-transforming the readout image. Then, the correction unit 25 generates a corrected frequency image by multiplying each frequency component of the frequency image by an enhancement coefficient $\alpha(u,v)$. The letter, u indicates the frequency in the horizontal direction, and v the frequency in the vertical direction. The enhancement coefficient $\alpha(u,v)$ is chosen to have a value larger than 1, for example, a value within a range of 1.1 to 2, for any frequency (u,v) whose absolute value is larger than a prescribed frequency $(u_0,v_0)$, and to have a value of 1 for any frequency whose absolute value is not larger than the prescribed frequency $(u_0,v_0)$. Here, for the frequencies (u,v) whose absolute values are larger than the prescribed frequency $(u_0,v_0)$, the enhancement coefficient $\alpha(u,v)$ may be chosen to have different values for different frequencies.

There are cases where the blur detection template that most closely matches the position detection marker is a template that has a blur only in a predetermined one-dimensional direction. In such cases, the correction unit 25 may set the value of the enhancement coefficient for frequency components in the blur direction larger than the value of the enhancement coefficient for frequency components in a direction orthogonal to that blur direction. For example, when the amount of blurring occurring only in the horizontal direction is superimposed on the blur detection template that most closely matches the position detection marker, the correction unit 25 sets the value of the enhancement coefficient α(u,v) larger than 1 for any frequency with v=0 and |u|>$u_0$, and sets the value of the enhancement coefficient α(u,v) equal to 1 for any frequency with u=0, regardless of the value of v. After that, the correction unit 25 obtains an edge-enhanced corrected image by inverse-Fourier-transforming the corrected frequency image.

It is preferable that the correction unit 25 sets the prescribed frequency ($u_0$,$v_0$) lower as the amount of blurring increases. By thus setting the frequency ($u_0$,$v_0$), lower frequencies are also enhanced, so that the edges of the corrected image are also enhanced.

The correction unit 25 may generate the edge-enhanced corrected image by using an alternative edge enhancement method, for example, by multiplying with an enhancement coefficient the difference between the value of an attention pixel and the pixel value averaged over the range of an unsharp mask defined around the attention pixel and by adding the result of the multiplication to the value of the attention pixel. In this case, the correction unit 25 sets the size of the unsharp mask larger as the amount of blurring increases. If the blur detection template that most closely matches the readout image is a template that has a blur only in a predetermined one-dimensional direction, the correction unit 25 sets the unsharp mask so that it is longer in the direction along which the blur is superimposed than in the direction along which no blur is superimposed. For example, when the amount of blurring occurring only in the vertical direction is superimposed on the blur detection template that most closely matches the readout image, the correction unit 25 sets the horizontal length of the unsharp mask equal to the length of one pixel and sets the vertical length of the unsharp mask equal to the length of several to ten-odd pixels according to the amount of blurring.

The correction unit 25 passes the corrected image to the decryption unit 26.

The decryption unit 26 produces the decrypted image by applying decryption to the readout image or the corrected image. Here, to facilitate understanding of the decryption process performed by the decryption unit 26, one example of the decryption to be applied to the original image will be described below.

The encryption device that performs encryption first divides the region to be encrypted within the original image into a plurality of blocks, and assigns a unique number to each block. For example, the encryption device divides the region to be encrypted into three blocks vertically and four blocks horizontally, i.e., a total of 12 blocks, and assigns numbers 1 to 12 to the respective blocks. Next, the encryption device performs scrambling to rearrange the order of the blocks in a random manner by using an encryption key. For that purpose, the encryption device constructs a mapping table that defines a mapping between the positions of the blocks before and after the conversion by using the encryption key. For example, let x denote the block number after the conversion and y denote the block number before the conversion. Then, the block conversion equation corresponding to the scrambling is given by the following equation.

$$y=(px) \bmod q \quad (7)$$

In equation (7), p and q are primes used in the encryption key.

FIG. 8 illustrates the mapping between the position of each block on the original image and the position of each block on the scrambled image when the original image is divided into three blocks vertically and four blocks horizontally and when p=7 and q=13.

In FIG. 8, the image 801 is the original image, and the image 802 is the encrypted image produced by applying scrambling to the original image 801. The number indicated within each block in the original image 801 and encrypted image 802 is the number of that block in the original image. For example, from equation (7), when x is 1, the corresponding value y is 7. Accordingly, the encryption device performs scrambling by moving the block whose block number y before the conversion is 7 to the position of the block whose block number x after the conversion is 1. Hereinafter, the block as a unit based on which each pixel is moved from one position to another by scrambling is called the position conversion block.

By reference to the position of the position detection marker, the decryption unit 26 identifies the encrypted region where the encrypted image is located on the readout image. The decryption unit 26 applies descrambling to the encrypted region. By using the encryption key used for scrambling and the block position conversion equation (7), the decryption unit 26 can determine the original position y within the encrypted image for the position conversion block whose position after the scrambling is x. Then, by moving each position conversion block in the encrypted image to the original position of the position conversion block, the decryption unit 26 can recover the decrypted image in which the position of each position conversion block is the same as the position in the original image. The decryption unit 26 outputs the decrypted image.

Figure 9:
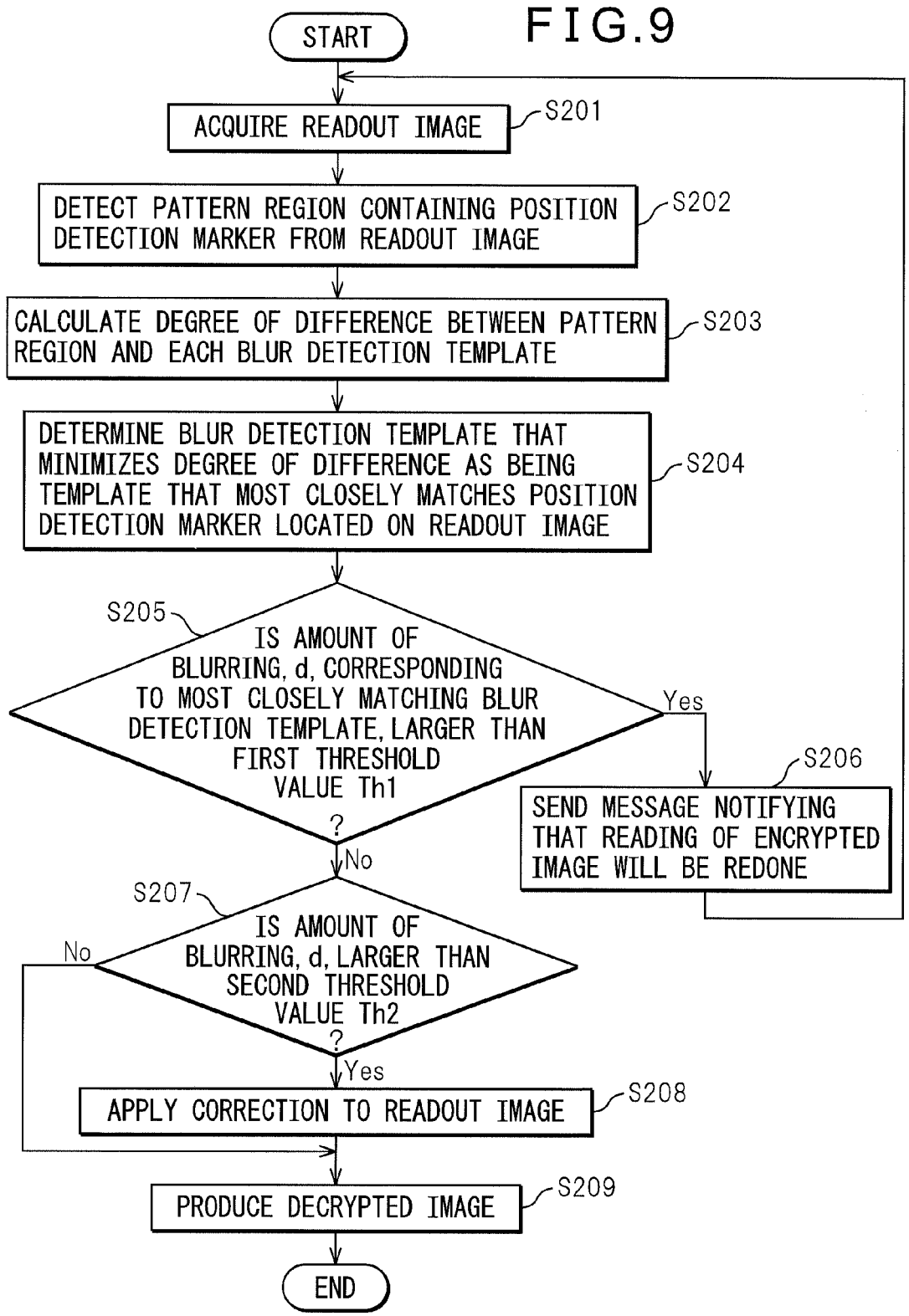
FIG. 9 is an operation flowchart illustrating image processing which is controlled by a computer program executed on the processing unit in the image processing apparatus according to the first embodiment.

FIG. 9 is an operation flowchart illustrating image processing which is controlled by a computer program executed on the processing unit in the image processing apparatus.

The processing unit 13 acquires the readout image from the image capturing apparatus 2 or the storage unit 12 (step S201). Then, the processing unit 13 passes the readout image to the pattern detection unit 22.

The pattern detection unit 22 detects the pattern region containing the position detection marker, i.e., the known pattern, from the readout image (step S202). The pattern detection unit 22 passes information indicating the position and size of the pattern region to the matching unit 23.

The matching unit 23 calculates the degree of difference between the pattern region and each of the blur detection templates (step S203). Then, the matching unit 23 determines the blur detection template that minimizes the degree of difference as being the template that most closely matches the position detection marker located on the readout image (step S204). The matching unit 23 notifies the decision unit 24 of the identification number corresponding to the blur detection template that minimizes the degree of difference.

By reference to the identification number corresponding to the blur detection template that most closely matches the position detection marker contained in the readout image, the decision unit 24 reads the storage unit 12 and retrieves the amount of blurring, d, corresponding to that blur detection template. Then, the decision unit 24 determines whether the amount of blurring, d, corresponding to the blur detection template that most closely matches the position detection marker contained in the readout image is larger than the first threshold value Th1 (S205). If the amount of blurring, d, is larger than the first threshold value Th1 (Yes in step S205), the decision unit 24 notifies the processing unit 13 that the amount of blurring superimposed on the readout image is large. In response, the processing unit 13 sends a message, via the user interface not depicted, notifying the user that the reading of the encrypted image will be redone (step S206). After that, the processor 13 repeats the process from step S201.

On the other hand, if the amount of blurring, d, is not larger than the first threshold value Th1 (No in step S205), the decision unit 24 determines whether the amount of blurring, d, is larger than the second threshold value Th2 (S207). If the amount of blurring, d, is larger than the second threshold value Th2 (Yes in step S207), the decision unit 24 notifies the processing unit 13 that the readout image needs to be corrected. In response, the processing unit 13 passes the amount of blurring, d, and the readout image to the correction unit 25. The correction unit 25 applies correction such as edge enhancement to the readout image according to the amount of blurring, d (step S208). The correction unit 25 passes the thus corrected image to the decryption unit 26

On the other hand, if the amount of blurring, d, is not larger than the second threshold value Th2 (No in step S207), the decryption unit 26 produces the decrypted image by decrypting the readout image (step S209), or after step S208, the decryption unit 26 produces the decrypted image by decrypting the readout image (step S209). After that, the processing unit 13 terminates the process for processing the readout image.

As described above, the image processing apparatus according to the first embodiment identifies the template that most closely matches the known pattern contained in the image printed on the medium from among the plurality of blur detection templates created by superimposing different amounts of blurring on that pattern. Then, the image processing apparatus estimates that the amount of blurring corresponding to the most closely matching template represents the amount of blurring superimposed on the readout image. In this way, the image processing apparatus can accurately estimate the amount of blurring superimposed on the readout image. Then, based on the amount of blurring superimposed on the readout image, the image processing apparatus can determine whether the reading of the image needs to be redone or not or whether the image needs to be corrected or not.

Next, an image processing apparatus according to a second embodiment will be described.

Figure 10:
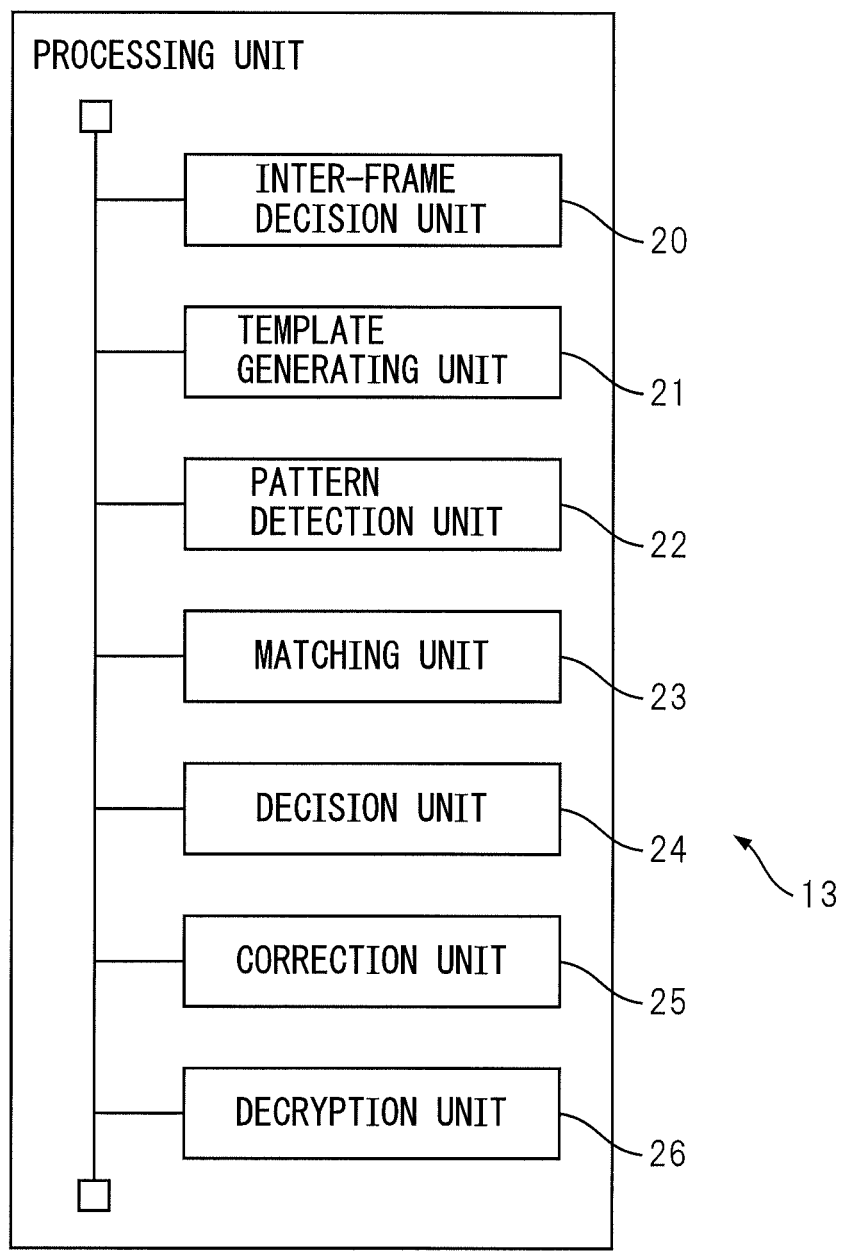
FIG. 10 is a block diagram illustrating the functional configuration of a processing unit according to a second embodiment.

FIG. 10 is a functional block diagram of the processing unit 13 according to the second embodiment. As depicted in FIG. 10, the processing unit 13 further includes an inter-frame decision unit 20. In FIG. 10, the functional blocks of the processing unit 13 corresponding to those of the processing unit 13 in FIG. 4 are designated by the same reference numerals.

The image processing apparatus according to the second embodiment differs from the image processing apparatus according to the first embodiment by the inclusion of the inter-frame decision unit 20 which makes a decision as to whether blur is superimposed on the readout image by detecting the presence or absence of a difference between a plurality of readout images captured from the same encrypted image. The inter-frame decision unit 20 will be described below.

The inter-frame decision unit 20 detects an inter-frame difference between two readout images captured from the same encrypted image, and calculates the degree of difference between the two readout images. If the degree of difference is larger than a predetermined threshold value, the inter-frame decision unit 20 determines that blur is superimposed at least on one of the two readout images. The inter-frame decision unit 20 then discards either one or both of the two readout images.

More specifically, the inter-frame decision unit 20 calculates the absolute pixel value difference for each pair of corresponding pixels between the two readout images, and determines the degree of difference between the two readout images by taking the sum of the absolute differences over the entire images. If the degree of difference is smaller than the predetermined threshold value, the inter-frame decision unit 20 determines that the amount of blurring superimposed on each of the two readout images is small and, therefore, the two readout images match. Then, the inter-frame decision unit 20 passes one or the other of the two readout images to the processing unit 13. The processing unit 13 performs the image processing according to the foregoing first embodiment on the readout image received from the inter-frame decision unit 20.

On the other hand, if the degree of difference is not smaller than the predetermined threshold value, the inter-frame decision unit 20 determines that at least one of the two readout images is significantly blurred. The inter-frame decision unit 20 notifies the processing unit 13 that the two readout images do not match. In this case, the inter-frame decision unit 20 discards at least one of the two readout images, for example, the earlier generated one. Then, the processing unit 13 notifies the user, via the user interface not depicted, to recapture the encrypted image. If some other readout image captured from the same encrypted image is prestored in the storage unit 12, the processing unit 13 retrieves that readout image from the storage unit 13 and passes it to the inter-frame decision unit 20. Then, the inter-frame decision unit 20 determines whether the newly acquired readout image matches the readout image not discarded or whether the newly acquired two readout images match each other.

There are cases where the values of the pixels contained in a region other than the encrypted image region on the readout image are substantially the same, such as when nothing is printed in the region other than the encrypted image region on the medium. In such cases, if the inter-frame difference is taken over the entire readout images as described above, the degree of difference may be detected as being small, because in the region where the pixel values are substantially the same, the inter-frame difference in pixel value is small even when the amount of blurring is large.

In view of this, the inter-frame decision unit 20 may divide each of the two readout images into a plurality of blocks and may calculate the degree of difference for each pair of corresponding blocks between the two readout images. Then, if the largest of the thus calculated degrees of difference is larger than the predetermined threshold value, the inter-frame decision unit 20 may determine that at least one of the two readout images is significantly blurred.

There are also cases where the brightness of the entire image or a portion of the image differs for each readout image, depending, for example, on the brightness of the shooting environment at the time of capturing the encrypted image. In view of this, the inter-frame decision unit 20 may calculate the degree of difference between the two readout images after normalizing the values of the pixels in the respective readout images. In this case, the inter-frame decision unit 20 can normalize each readout image by using the earlier given equation (5), for example, by setting the test region over the entire readout image.

Further, the position and size of the encrypted region where the encrypted image is located on the readout image varies according to the position of the image capturing apparatus 2 relative to the medium when capturing the encrypted image. In view of this, the inter-frame decision unit 20 may identify the encrypted region on each readout image by performing the same processing as that of the pattern detection unit 22 on the readout image and thereby locating the positions of the plurality of position detection markers. Then, the inter-frame decision unit 20 applies a position transformation such as affine transformation to one of the readout images so as to make the position and size of the encrypted region match between the two readout images. Then, the inter-frame decision unit 20 may determine the degree of difference by calculating the inter-frame difference between the encrypted regions.

FIG. 11 is an operation flowchart illustrating image processing which is controlled by a computer program executed on the processing unit 13 in the image processing apparatus according to the second embodiment. In the flowchart of FIG. 11, the process from step S304 to step S311 is the same as the process from step S202 to step S209 in the flowchart of FIG. 9. Therefore, the following describes the process from step S301 to S303.

The processing unit 13 acquires two readout images from the storage unit 12 (step S301). Then, the processing unit 13 passes the two readout images to the inter-frame decision unit 20.

The inter-frame decision unit 20 calculates the degree of difference between the entire areas of the two readout images or at least selected regions of the two readout images (step S302). Then, the inter-frame decision unit 20 determines whether or not the degree of difference is smaller than a predetermined threshold value Th3 (step S303).

If the degree of difference is smaller than the predetermined threshold value Th3 (Yes in step S303), the inter-frame decision unit 20 passes one of the two readout images to the processing unit 13. Then, the processing unit 13 performs the process of steps S304 to S311 on the readout image received from the inter-frame decision unit 20.

On the other hand, if the degree of difference is not smaller than the predetermined threshold value Th3 (No in step S303), the inter-frame decision unit 20 notifies the processing unit 13 that the two readout images do not match. The inter-frame decision unit 20 discards at least one of the two readout images. Then, the processing unit 13 notifies the user to recapture the encrypted image (step S308). After that, the processing unit 13 repeats the process from step S301.

As described above, the image processing apparatus according to the second embodiment compares the two readout images captured from the same encrypted image, and detects the amount of blurring superimposed on one of the readout images, only when the two images match. The image processing apparatus can thus eliminate the need for the template matching process which is performed to detect the amount of blurring when one of the readout images is blurred. As a result, the image processing apparatus can reduce the amount of computation for detecting the amount of blurring.

The present invention is not limited to the above specific embodiments. According to an alternative embodiment, the blur detection template may be generated by converting the blur detection template according to each of the above embodiments into a frequency spectrum by using a frequency transform technique such as a Fourier transform or discrete cosine transform. In this case, the blur detection template represents the frequency spectrum of a pixel value distribution when a prescribed amount of blurring is superimposed on a known pattern such as the position detection marker. Generally, as the amount of blurring superimposed on the pattern becomes larger, the pixel value changes more gradually across the black/white block boundary; as a result, the high frequency components contained in the frequency spectrum corresponding to the blur detection template decrease.

When the blur detection template representing such a frequency spectrum is used, the matching unit also converts the test region into a frequency spectrum. Then, the matching unit 23 compares the frequency spectrum of the test region with the frequency spectrum of the blur detection template on a frequency-by-frequency basis, and calculates the degree of difference by taking the sum of the absolute differences between the frequency components.

According to another alternative embodiment, the matching unit may determine the blur detection template that most closely matches each of the plurality of position detection markers contained in the readout image. In this case, the decision unit may determine the amount of blurring superimposed on the readout image by calculating the average value or the sum of the amounts of blurring corresponding to the blur detection templates judged to most closely match the respective position detection markers.

According to still another alternative embodiment, the storage unit of the image processing apparatus may store blur detection templates generated in advance by some other apparatus. In this case, the function of the template generating unit may be omitted from the processing unit of the image processing apparatus.

According to a further alternative embodiment, if the image printed on the medium is an image that contains a known pattern, such as a two-dimensional code, but is not an encrypted image, the processing unit of the image processing apparatus need not necessarily be provided with the decryption unit. Instead, the processing unit may include an information extraction unit for extracting the information contained in the two-dimensional code. The information extraction unit extracts the information from the two-dimensional code contained in the readout image, in accordance with a rule predetermined for the two-dimensional code.

According to a still further alternative embodiment, the processing unit of the image processing apparatus need not necessarily be provided with the correction unit. In this case, the process from step S207 to step S208 in the flowchart of FIG. 9 and the process from step S309 to step S310 in the flowchart of FIG. 11 are omitted.

Further, the image to be processed by the image processing apparatus according to each of the above embodiments may be an image formed on a medium by other means than printing.

The encrypted image converted into electronic data by the image capturing apparatus may be a color image. For example, when the encrypted image converted into electronic data has luminance information for each of three colors, red (R), green (G), and blue (B), the image processing apparatus according to each of the above embodiments may perform the image processing on one of the three colors. Alternatively, the image processing apparatus may perform a color conversion for converting the readout image into HSV color space and obtain luminance information for each pixel, and may perform the above processing based on the luminance information.

Further, the computer program for causing a computer to implement the various functions of the processing unit of the image processing apparatus according to the first or second embodiment may be provided in the form recorded on a medium readable by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
an interface unit for acquiring a readout image produced by capturing an image formed on a medium;
a storage unit for storing a plurality of templates generated by superimposing different amounts of blurring on a prescribed pattern contained in said image, and for storing the amounts of blurring superimposed on said plurality of templates, respectively; and
a processing unit adapted to detect a pattern region where said prescribed pattern is located on said readout image,
calculate the degree of matching between said pattern region and each of said plurality of templates and, based on said degree of matching, identify from among said plurality of templates a template that most closely matches said prescribed pattern located on said readout image, and
estimate that the amount of blurring corresponding to said most closely matching template represents the amount of blurring superimposed on said readout image,
wherein said plurality of templates include a first template generated by superimposing the amount of blurring on an element-displaced pattern which is a pattern formed in such a manner that when an image of said prescribed pattern is captured by an image capturing apparatus having an arrangement of light receiving elements, if a boundary between a first pixel having a first pixel value and a second pixel having a second pixel value larger than the first pixel value, the first and second pixels being contained in said prescribed pattern, falls on one of the light receiving elements, a value intermediate between the first pixel value and the second pixel value is taken as a corresponding pixel value corresponding to the one of the light receiving elements.

2. The image processing apparatus according to claim 1, wherein when said estimated amount of blurring is larger than a first threshold value, said processing unit acquires a second readout image produced by capturing the image formed on said medium, and performs the detection of said pattern region, the identification of said template, and the estimation of said amount of blurring by using said second readout image as said readout image.

3. The image processing apparatus according to claim 2, wherein said plurality of templates include a second template generated by superimposing said amount of blurring on a resize pattern which is a pattern formed by magnifying or demagnifying said prescribed pattern by a prescribed magnification factor.

4. The image processing apparatus according to claim 3, wherein when said most closely matching template is said second template, the estimation of said amount of blurring is performed by increasing said first threshold value as said prescribed magnification factor increases.

5. The image processing apparatus according to claim 2, wherein said processing unit is further adapted to apply edge enhancement to said readout image when said estimated amount of blurring is not larger than said first threshold value but larger than a second threshold value which is smaller than said first threshold value.

6. The image processing apparatus according to claim 5, wherein said plurality of templates include a second template whose amount of blurring is larger in a first direction than in a second direction orthogonal to said first direction, and wherein when said most closely matching template is said second template, said edge enhancement is applied to a greater degree in said first direction than in said second direction.

7. An image processing method comprising:
acquiring a readout image produced by capturing an image formed on a medium;
detecting a pattern region where a prescribed pattern contained in said image is located on said readout image;
calculating the degree of matching between said pattern region and each of a plurality of templates generated by superimposing different amounts of blurring on said prescribed pattern and, based on said degree of matching, identifying from among said plurality of templates a template that most closely matches said prescribed pattern located on said readout image; and
estimating that the amount of blurring corresponding to said most closely matching template represents the amount of blurring superimposed on said readout image,
wherein said plurality of templates include a first template generated by superimposing the amount of blurring on an element-displaced pattern which is a pattern formed in such a manner that when an image of said prescribed pattern is captured by an image capturing apparatus having an arrangement of light receiving elements, if a boundary between a first pixel having a first pixel value and a second pixel having a second pixel value larger than the first pixel value, the first and second pixels being contained in said prescribed pattern, falls on one of the light receiving elements, a value intermediate between the first pixel value and the second pixel value is taken as a corresponding pixel value corresponding to the one of the light receiving elements.

8. A non-transitory computer readable recording medium having an image processing computer program recorded thereon for causing a computer to perform a method comprising:
acquiring a readout image produced by capturing an image formed on a medium;
detecting a pattern region where a prescribed pattern contained in said image is located on said readout image;
calculating the degree of matching between said pattern region and each of a plurality of templates generated by superimposing different amounts of blurring on said prescribed pattern and, based on said degree of matching, identify from among said plurality of templates a template that most closely matches said prescribed pattern located on said readout image; and
estimating that the amount of blurring corresponding to said most closely matching template represents the amount of blurring superimposed on said readout image,
wherein said plurality of templates include a first template generated by superimposing the amount of blurring on an element-displaced pattern which is a pattern formed in such a manner that when an image of said prescribed pattern is captured by an image capturing apparatus having an arrangement of light receiving elements, if a boundary between a first pixel having a first pixel value and a second pixel having a second pixel value larger than the first pixel value, the first and second pixels being contained in said prescribed pattern, falls on one of the light receiving elements, a value intermediate between the first pixel value and the second pixel value is taken as a corresponding pixel value corresponding to the one of the light receiving elements.

* * * * *